G. R. DREW.
Combined Rule, Square, and Comb.

No. 201,599. Patented March 26, 1878.

WITNESSES
Saml R Turner
C M Sites

INVENTOR
George R. Drew
By R S & A P Lacey
ATTORNEY

UNITED STATES PATENT OFFICE.

GEORGE R. DREW, OF MILLBURN, NEW JERSEY.

IMPROVEMENT IN COMBINED RULE, SQUARE, AND COMB.

Specification forming part of Letters Patent No. 201,599, dated March 26, 1878; application filed February 23, 1878.

*To all whom it may concern:*

Be it known that I, GEORGE R. DREW, of Millburn, in the county of Essex and State of New Jersey, have invented certain new and useful Improvements in Pocket Combs and Rules; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is to furnish an improved article of manufacture which can be used as a pocket comb, rule, try-square, or straight-edge, as occasion may require.

It consists of a substantial casing, in which is pivoted a comb, with capability of being revolved on its pivot at pleasure.

Figure 1:
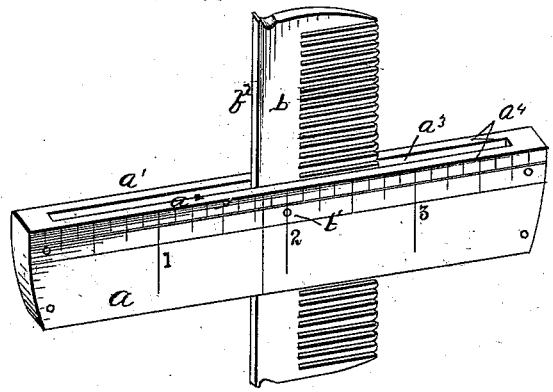
Figure 2:
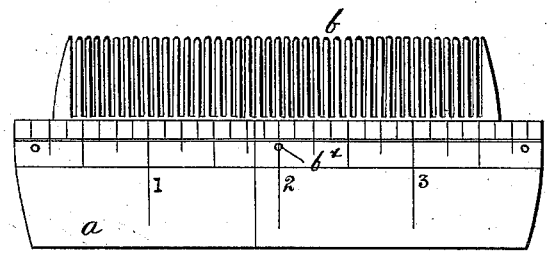
Figure 3:
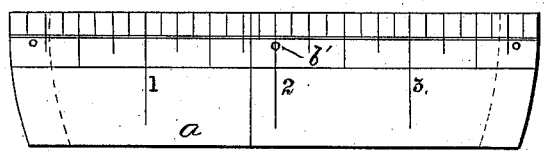

In the drawings, Figure 1 is a perspective, and Figs. 2 and 3 are side elevations, of my device in different positions.

$a$ is the casing, which consists of the sides $a^1$ $a^2$, secured at their ends so as to form a slot or opening, $a^3$, in which is pivoted the comb $b$, as shown. The edge $a^4$ is made straight, adapting it to be used as a straight-edge, and on one or both of the sides is formed a graduated rule or scale, as shown. $b$ is the comb, pivoted at its center on the pin $b^1$ within the casing $a$, and with capability of being turned to any desired angle with the edge $a^4$.

It will be seen by reference to the drawings that when the comb is turned in the position shown in Fig. 1, its straight back $b^2$ set on a line with one of the graduations of the rule, a try-square will be formed; completing the revolution, as shown in Fig. 2, a convenient and substantial pocket-comb is formed, and when closed a straight-edge and rule are provided, as shown in Fig. 3.

Having described my invention, what I claim, and desire to secure by Letters Patent, is—

A new article of manufacture consisting of a comb having a straight back or edge, and pivoted at its center, and the case $a$, having a straight-edge and rule or scale, arranged substantially as set forth.

In testimony that I claim the foregoing as my own I affix my signature in presence of two witnesses.

GEORGE R. DREW.

Witnesses:
 JOHN MCLAUGHLIN,
 JOSIAH C. SHIPMAN.